United States Patent
Richter et al.

(10) Patent No.: US 6,488,981 B1
(45) Date of Patent: Dec. 3, 2002

(54) METHOD OF MANUFACTURING A TOUCH SCREEN PANEL

(75) Inventors: Paul J. Richter, Chelmsford, MA (US); Michael J. Kardauskas, Billerica, MA (US); Frank J. Bottari, Acton, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/885,144

(22) Filed: Jun. 20, 2001

(51) Int. Cl.$^7$ ............... B05D 3/02; B05D 5/12; B05D 1/36; B05D 1/00; C23C 16/00
(52) U.S. Cl. ............ 427/58; 427/123; 427/126.2; 427/126.3; 427/557; 427/376.2; 427/376.3; 427/376.6; 427/383.1; 427/404; 427/419.2; 427/419.3; 427/248.1; 427/255.28; 427/284; 427/264; 427/271; 427/430.1; 427/428; 204/192.1
(58) Field of Search .............. 427/58, 126.2, 427/126.3, 123, 557, 376.1, 376.2, 376.3, 376.6, 383.1, 404, 419.2, 419.3, 248.1, 255.28, 430.1, 428, 258, 284, 264, 271, 162; 204/192.1

(56) References Cited

U.S. PATENT DOCUMENTS

| | | |
|---|---|---|
| 2,711,983 A | 6/1955 | Hoyt |
| 3,560,385 A | 2/1971 | Roth |
| 3,607,448 A | 9/1971 | Dunlap |
| 3,729,819 A | 5/1973 | Horie |
| 3,730,701 A | 5/1973 | Isquith et al. |
| 3,798,370 A | 3/1974 | Hurst |
| 3,860,709 A | 1/1975 | Abbott et al. |
| 4,150,877 A | 4/1979 | Kobale et al. ............ 349/131 |
| 4,198,539 A | 4/1980 | Pepper, Jr. |
| 4,220,815 A | 9/1980 | Gibson et al. |
| 4,288,357 A | 9/1981 | Kanazawa et al. |
| 4,293,734 A | 10/1981 | Pepper, Jr. |
| 4,316,041 A | 2/1982 | Totten et al. |

(List continued on next page.)

FOREIGN PATENT DOCUMENTS

| | | |
|---|---|---|
| GB | 1386876 | 3/1975 |
| GB | 1433303 | 4/1976 |
| JP | 8-185560 | 7/1996 |
| WO | WO00/43831 | 7/2000 |

OTHER PUBLICATIONS

Uchida et al., "Surface Alignment of Liquid Crystals", Liquid Crystals Applications and Uses, vol. 3, pp. 7–9, 1990.
Kahn et al., "Surface Produced Alignment of Liquid Crystals" Proceedings of the IEEE, vol. 61, No. 7, pp. 823–828, Jul., 1973.
Haller, "Alignment and Wetting properties of Nematic Liquids" Applied Physics Lett., vol. 24, No. 8, pp. 349–351, Apr. 1974.
J. Harrison and S. Perry, "Friction in the Presence of Molecular Lubricants and Solid/Hard Coatings", MRS Bulletin 1998.
Frederic J. Kahn, "Orientation of liquid crystals by surface coupling agents", Applied Physics Lett., vol. 22, No. 8, Apr. 15, 1973.
U.S. patent application Ser. No. 09/165,404, Li et al., filed Oct. 2, 1998.

(List continued on next page.)

*Primary Examiner*—Michael Barr
(74) *Attorney, Agent, or Firm*—Robert J. Pechman

(57) ABSTRACT

A method of manufacturing a touch screen panel, the method including applying a resistive coating to one surface of an insulative substrate, applying an insulative protective coating to the resistive coating, depositing a conductive edge electrode pattern including a plurality of edge electrodes on the protective coating, and firing the panel until the edge electrodes etch through the protective coating and make electrical contact with the resistive coating.

37 Claims, 3 Drawing Sheets

U.S. PATENT DOCUMENTS

| | | | |
|---|---|---|---|
| 4,369,063 A | 1/1983 | McGowan, Jr. | |
| 4,371,746 A | 2/1983 | Pepper, Jr. | |
| 4,388,453 A | 6/1983 | Finkelman et al. | |
| 4,422,732 A | 12/1983 | Ditzik | |
| 4,496,482 A | 1/1985 | Totten et al. | |
| 4,527,862 A | 7/1985 | Arakawa | 349/122 |
| 4,548,842 A | 10/1985 | Pohl | |
| 4,600,807 A | 7/1986 | Kable | |
| 4,661,655 A | 4/1987 | Gibson et al. | |
| 4,678,283 A | 7/1987 | Kreuzer et al. | |
| 4,694,573 A | 9/1987 | Nishino et al. | |
| 4,697,885 A | 10/1987 | Minowa et al. | |
| 4,730,904 A | 3/1988 | Pauluth et al. | |
| 4,731,508 A | 3/1988 | Gibson et al. | |
| 4,774,028 A | 9/1988 | Imai et al. | |
| 4,822,957 A | 4/1989 | Talmage, Jr. et al. | |
| 4,844,986 A | 7/1989 | Karakelle et al. | |
| 4,846,869 A | 7/1989 | Palanisamy | |
| 4,847,120 A | 7/1989 | Gent | |
| 4,866,192 A | 9/1989 | Plueddemann et al. | |
| 4,911,536 A | 3/1990 | Ditzik | |
| 4,940,602 A | 7/1990 | Taniguchi et al. | |
| 4,954,153 A | 9/1990 | Coleman et al. | |
| 4,985,286 A | 1/1991 | Kurita et al. | |
| 5,041,701 A | 8/1991 | Wolfe et al. | |
| 5,045,644 A | 9/1991 | Dunthorn | |
| 5,266,222 A | 11/1993 | Willis et al. | |
| 5,335,373 A | 8/1994 | Dangman et al. | |
| 5,346,651 A | 9/1994 | Oprosky et al. | |
| 5,437,817 A | 8/1995 | Kondou et al. | |
| 4,220,815 A | 9/1996 | Gibson et al. | |
| 4,661,655 A | 1/1997 | Gibson et al. | |
| 5,796,389 A | 8/1998 | Bertram et al. | |
| 5,815,141 A | 9/1998 | Phares | |
| 5,886,687 A | 3/1999 | Gibson | |
| 5,940,065 A | 8/1999 | Babb et al. | |
| 6,163,313 A * | 12/2000 | Aroyan et al. | 178/18.04 |
| 6,280,552 B1 * | 8/2001 | Bottari | 156/230 |
| 6,406,758 B1 * | 6/2002 | Bottari et al. | 427/162 |
| 2001/0036504 A1 | 11/2001 | Bottari et al. | |

OTHER PUBLICATIONS

U.S. patent application Ser. No. 09/169,391, Huang et al., filed Oct. 9, 1998.

U.S. patent application Ser. No. 09/233,305, Li et al., filed Jan. 19, 1999.

U.S. patent application Ser. No. 09/626,272, Richter et al., filed Jul. 25, 2000.

U.S. patent application Ser. No. 09/773,979, Bottari et al., filed Feb. 1, 2001.

U.S. patent application Ser. No. 09/775,253, Bottari et al., filed Feb. 2, 2001.

* cited by examiner

METHOD OF MANUFACTURING A TOUCH SCREEN PANEL

FIELD OF THE INVENTION

This invention relates to a method of manufacturing a touch screen panel in which transparent hard coat material is deposited before the edge electrodes and the wire traces so that the hard coat is under the edge electrodes to eliminate the color variation present at the edges of the panel when the transparent hard coat material is deposited over the edge electrodes and wire traces.

BACKGROUND OF THE INVENTION

Touch screens are now ubiquitous and used as the input and display interface at, for example, automatic teller machines, gambling machines in casinos, cash registers, and the like. Touch screen panels generally comprise an insulative (e.g., glass) substrate and a resistive layer disposed on the insulative substrate. A pattern of conductive edge electrodes are then formed on the edges of the resistive layer. The conductive electrodes form orthogonal electric fields in the X and Y directions across the resistive layer. Contact of a finger or stylus on the active area of the panel then causes the generation of a signal that is representative of the X and Y coordinates of the location of the finger or the stylus with respect to the substrate. In this way, the associated touch panel circuitry connected to the touch panel by wires or wiring traces can ascertain where the touch occurred on the substrate. Typically, a computer program generates an option to the user (e.g., "press here for 'yes' and press here for 'no'") on a monitor underneath the touch screen panel and the conductive edge electrode pattern assists in detecting which option was chosen when the touch panel was used by the user.

In the prior art, a resistive layer (e.g., tin antimony oxide) is sputtered onto a glass substrate. The conductive edge electrodes and wire traces are then deposited on the resistive layer about the periphery of the panel using a thick film paste. A $SiO_2$ transparent hard coating is then applied to the panel over the conductive edge electrodes and wire traces to protect the panel during use.

Because of the thickness of the edge electrodes and wire traces, however, the hard coat is not planar and instead rises up at the edges of the panel causing a cosmetic defect in that color variations are present at the edges of the panel. These unacceptable color variations are a major yield issue of capacitive touch screen panels incorporating $SiO_2$ transparent hard coatings applied by a wet chemical processes when the liquid hard coat material dams and drains around the edge electrodes and wire traces.

Furthermore, cracking and islanding of the thick-film material causes functional failures and is an additional major yield issue in capacitive touch screen manufacturing. This problem is caused by a chemical interaction between the thick-film of the edge electrodes and wire traces and the $SiO_2$ transparent hard coating and by mechanical stress on the thick-film during densification of the $SiO_2$ hard coating network.

If, on the other hand, the $SiO_2$ transparent hard coat material is deposited before the edge electrodes and the wire traces so that the hard coat is under the edge electrodes and wire traces to eliminate the color variation problems, the hard coat material prevents the establishment of the correct electrical connection between the edge electrodes and the wire traces with the resistive coating.

SUMMARY OF THE INVENTION

It is therefore an object of this invention to provide a new method of manufacturing a touch screen panel.

It is a further object of this invention to provide such a method which eliminates color variations at the edges of the panel.

It is a further object of this invention to provide such a method which reduces or eliminates functional failures of the touch screen panels which occur due to cracking or islanding of the thick-film of the edge electrodes and wire traces.

It is a further object of this invention to provide such a method which increases the yield in the manufacture of capacitive touch screens.

It is a further object of this invention to provide such a method which eliminates the $SiO_2$ coating over the thick-film conductive material of the edge electrodes and wire traces to thereby minimize the adverse interactive effects associated with the prior art where the $SiO_2$ coating covered the edge electrodes and the wire traces.

It is a further object of this invention to provide such a touch screen panel with an $SiO_2$ hard coat which is more fully densified.

This invention results from the realization that the color variations and the other problems associated with applying an insulative protective coating to touch screen panels over the edge electrodes and wire traces can be overcome by evenly applying the insulative protective coating to the touch screen panel before the edge electrode pattern is deposited thereon and by adding a sodium carbonate or sodium formate composition to the thick film silver/frit paste of the edge electrode and wire trace material so that the edge electrodes etch through the protective coating when the panel is fired to thus properly establish electrical contact with the resistive coating on the panel under the protective coating.

This invention features a method of manufacturing a touch screen panel in which a resistive coating is applied to one surface of an insulative substrate, an insulative protective coating is applied to the resistive coating, a conductive edge electrode pattern including a plurality of edge electrodes is deposited on the protective coating, and the panel is fired until the edge electrodes etch through the protective coating and make electrical contact with the resistive coating.

Preferably, the material of the edge electrodes includes conductive paste mixed with an additive. The insulative protective coating may be or include silicon dioxide and the additive then may include a chemical compound which is converted into a molten alkali hydroxide at elevated temperatures which dissolves the silicon dioxide of the protective coating. Typically, the chemical compound is selected from the group consisting of sodium carbonates and/or sodium formates. Usually, the conductive paste is a silver/frit composition. The additive typically comprises 1–25% by weight of the conductive paste.

The step of applying the resistive coating may include methods such as sputtering, evaporation, chemical vapor deposition, screen printing, or pad printing. The step of applying the insulative protective coating may include dip coating, meniscus coating, sputtering, evaporation, chemical vapor deposition, screen printing, or pad printing.

In one embodiment, the insulative protective coating is cured before the conductive edge electrode pattern is deposited thereon. Firing includes subjecting the panel to an elevated temperature via infrared radiation having a wavelength of between 2.5 and 6.0 microns.

In the preferred embodiment, a wire trace pattern is also deposited on the protective coating and the panel is fired until the wire trace pattern etches through the protective coating and makes electrical contact with the resistive coating. As such, the material of the wire trace pattern then includes conductive paste mixed with an additive. When the insulative protective coating includes silicon dioxide, the additive includes a chemical compound which is converted into a molten alkali hydroxide at elevated temperatures which dissolves the silicon dioxide of the protective coating.

The method may further include placing a wire trace pattern on the panel and providing electrical isolation between the wire traces and the edge electrodes. The method of providing electrical isolation may include incorporating a dielectric layer between the trace pattern and the protective coating. Electrical isolation may also be provided by incorporating a dielectric layer between the edge electrodes and the wire traces. Alternatively, by not adding an additive to the material at the wire traces, they do not etch through the protective coating and thus are electrically isolated from the edge electrodes.

This invention features a method of manufacturing a touch screen panel, the method comprising: applying a resistive coating to one surface of an insulative substrate, applying an insulative protective coating to the resistive coating, mixing a conductive paste with an additive, depositing the mixture in the form of a conductive edge electrode pattern including a plurality of edge electrodes on the protective coating, and firing the panel until the edge electrodes etch through the protective coating and make electrical contact with the resistive coating. The insulative protective coating usually includes silicon dioxide and the additive includes a chemical compound which is converted into a molten alkali hydroxide at elevated temperatures which dissolves the silicon dioxide of the protective coating. The chemical compound may be selected from the group consisting of sodium carbonates and/or sodium formates. The conductive paste may be a silver/frit composition. The additive typically comprises 1–25% by weight of the conductive paste.

In the preferred embodiment, the method further includes depositing a wire trace pattern on the protective coating and firing the panel until the wire trace pattern etches through the protective coating and makes electrical contact with the resistive coating. The material of the wire trace pattern includes conductive paste mixed with an additive. The insulative protective coating includes silicon dioxide and the additive includes a chemical compound which is converted into a molten alkali hydroxide at elevated temperatures which dissolves the silicon dioxide of the protective coating.

The method may further include the step of providing electrical isolation between the wire trace pattern and the edge electrodes. In one embodiment, a laser is used to etch the protective material and the resistive material between the edge electrodes and the wire traces.

This invention also features a touch screen panel comprising an insulative substrate; a resistive coating on one surface of the substrate; a protective coating on the resistive coating; and a conductive edge electrode pattern including a plurality of edge electrodes on the protective coating and extending to the resistive coating and making electrical contact therewith.

The panel may also include a wire trace pattern on the protective coating. A dielectric material may be disposed between the wire trace pattern and the protective coating. Alternatively, a dielectric material may be disposed over the conductive edge electrode pattern and then the wire trace pattern is on the dielectric material.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
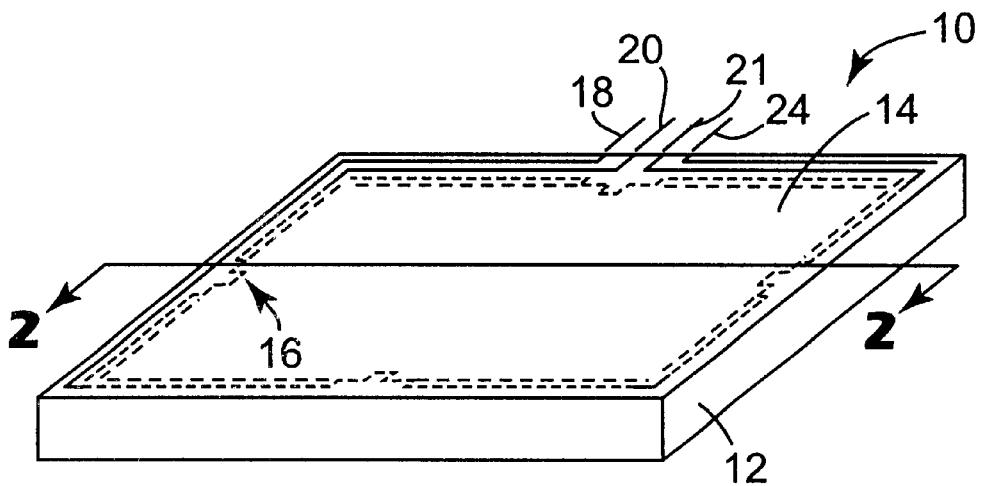
FIG. 1 is a schematic top view of a typical touch screen panel.
Figure 2:
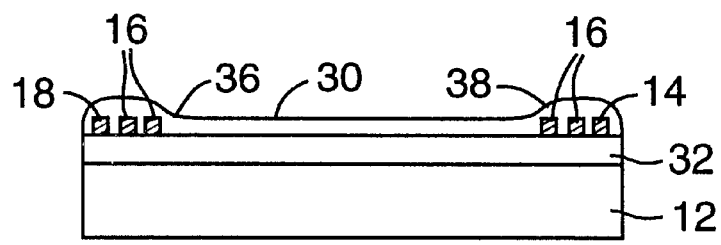
FIG. 2 is a cross sectional view of the panel shown in FIG. 2 taken along line 2—2.

As explained in the Background section above, typical touch screen panel 10, FIG. 1 includes insulative glass substrate 12 coated on surface 14 with resistive layer 32, FIG. 2 (e.g., tin antimony oxide). Conductive edge electrode pattern 16 and wire traces 18, 20, 22, and 24 are then formed on the periphery on panel 10 as shown by screen printing a thick-film conductive silver/frit paste (e.g., Dupont 7713 or Ferro 3350). Various patterns for the edge electrodes include those of U.S. Pat. Nos. 4,198,539; 4,293,734; or 4,371,746 and also U.S. patent application Ser. No. 09/169,391 all incorporated herein by this reference. Other methods of depositing the edge electrodes and wire trace patterns and isolating the edge electrodes from the wire traces and also isolating adjacent wire traces from each other are disclosed in application Ser. Nos. 09/775,253 and 09/773,979 incorporated herein by this reference.

In the prior art, transparent $SiO_2$ hard coat layer 30, FIG. 2 is applied over the panel by dipping, spraying, or other coating techniques. But, due to the thickness of the edge electrodes as shown at 36 and 38, the hard coat is not planar and rises up at the edges of the panel. Unacceptable color variations which result from interference patterns at the rises as shown at 36 and 38 are a major yield issue of capacitive touch screens incorporating $SiO_2$ transparent hard coatings applied by wet chemical processes. These variations are due to $SiO_2$ transparent hard coating thickness variations in close proximity to the thick-film edge electrode and wire trace patterns. This is caused by liquid coating solution damming and draining around the thick-film pattern applied to the perimeter of the touch screen and results in local areas of the coated surface that are thicker than the mean deposition thickness. The thickness variation manifests itself as an unacceptable color band which is considered to be a cosmetic defect. Moreover, the chemical interaction between the material of the edge electrodes and the wire traces and the $SiO_2$ transparent hard coating during densification of the $SiO_2$ hard coating results in cracking and islanding of the thick-film material of the edge electrodes and the wire traces which can cause functional failures. The mechanical stress on the thick-film material during densification of the $SiO_2$ hard coating material can also lead to cracking and islanding type functional failures of the edge electrode and/or wire trace pattern material.

Figure 3:
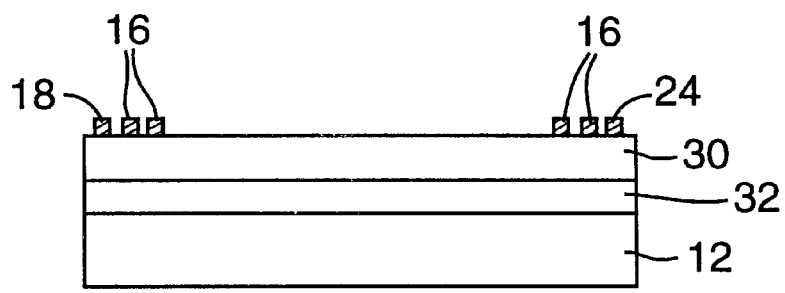
FIG. 3 is a schematic cross sectional view of the touch screen panel of the subject invention before firing.
Figure 4:
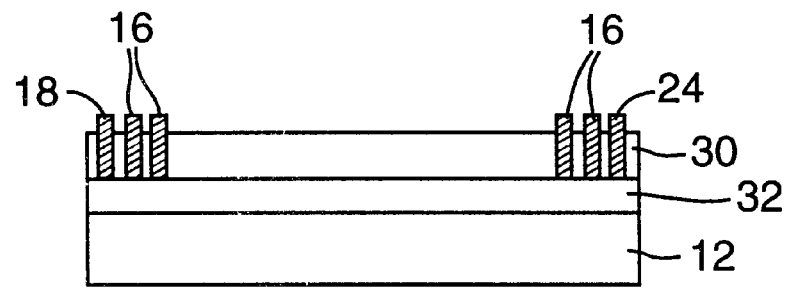
FIG. 4 is a schematic cross sectional view of the touch screen panel manufactured in accordance with the subject invention after firing.
Figure 5:
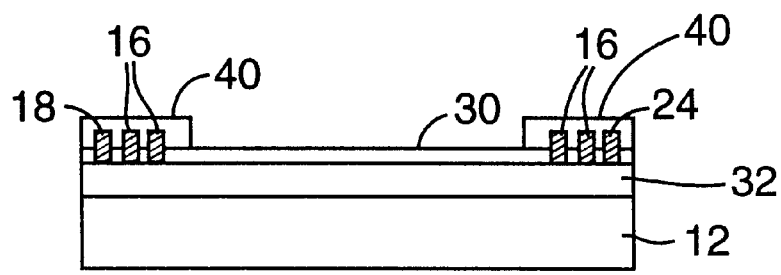
FIG. 5 is a cross sectional view of another touch screen panel manufactured in accordance with the subject invention.

In this invention, the color variations are eliminated because hard coat layer 30, FIG. 3 is deposited before edge electrode 16 and wire traces 18 and 24 so that the hard coat is under the edge electrodes and wire traces. As such, hard coat layer 30 is planar—flat and smooth everywhere even at the periphery of the panel because it is deposited directly on resistive coating 32. But, now, the edge electrodes and wire traces do not make electrical contact with resistive coating 32 as required in order to generate an electrical field across resistive layer 32. This problem is overcome in this invention by mixing an additive with the conductive paste used for the edge electrodes and wire traces which, when subjected to an elevated temperature, locally dissolves the silicon dioxide of the protective coating. Accordingly, when the panel is fired, edge electrodes 16 and wire traces 18 and 24 "fire-through" hard coating 30, FIG. 4 and establish electrical and physical contact with resistive coating 32. To electrically isolate the edge electrodes from wire traces 18 and 24 and to electrically isolate any two adjacent wire traces from each other, laser ablation techniques may be used to remove the resistive coating between the edge electrodes and the wire traces and any two adjacent wire traces. See U.S. patent application Ser. No. 09/773,979, filed Feb. 1, 2001, incorporated herein by this reference. Alternatively, the material of the wire traces is not modified by an additive so that the wire traces do not etch through the hard coat material and, as such, it provides the electrical isolation between the edge electrodes and the wire traces and between any two adjacent wire traces. In an optional step, a protective border layer 40, FIG. 5 is deposited on hard coating layer 30 over the edge electrodes and the wire traces and/or various anti-scratch and/or anti-microbial compositions can be added. See U.S. patent applications Ser. No's. 09/165,404; 09/233,305; and 09/626,272 now U.S. Pat. No. 6,406,758, incorporated herein by this reference.

In all embodiments, the color variations and the other problems associated with applying an insulative protective coating to touch screen panels over the edge electrodes and wire traces is overcome by evenly applying the insulative protective coating to the touch screen panel before the edge electrode pattern and wire traces are deposited and by adding the sodium hydrogen carbonate or sodium formate composition to the silver/frit paste of the edge electrode and wire trace material so that the edge electrodes etch through the protective coating when the panel is fired to thus properly establish electrical contact with the resistive coating on the panel. The fire-through method eliminates the unacceptable color variations associated with the prior art by applying the edge electrode pattern and the wire traces after the $SiO_2$ coating process is complete thus removing the edge electrodes and the wire traces as damming artifacts. Also, by using the fire-through method, the thick-film material of the edge electrodes and wire traces is not covered by the $SiO_2$ coating and the adverse interactive effects caused by the chemical interaction between the thick-film material and the $SiO_2$ transparent hard coating are minimized. Also, mechanical stress on the thick-film material during densification of the $SiO_2$ hardcoating network is minimized.

In the preferred embodiment, a thick-film conductive paste such as, but not limited to, Ferro 3350 or Dupont 7713 is mixed with an additive of sodium hydrogen carbonate or sodium formate in a range of 1–25% by weight. 2–5% of the additive by weight was found to be optimal. Using the fire-through process, this additive allows the thick-film conductive paste to achieve acceptable electrical contact with the underlying resistive coating. During processing, the front resistive coating or even both surfaces of the glass substrate are first coated with the transparent hard coat material and optionally thermally cured in augmentation with infrared radiation. See Copending application Ser. No. 09/626,272 filed Jul. 25, 2000, incorporated herein by this reference. The thick-film conductive paste prepared as described above is then applied to the substrate and thermally cured again with infrared radiation augmentation. Finally, a wiring harness is then connected to the touch screen panel. By firing the $SiO_2$ hard coating two times, a more durable hard coating is achieved due to further densification of the $SiO_2$ structure.

Thus, one object of the present invention is to incorporate one or more chemical compounds in the formulation of the thick film paste that will be converted into a molten alkali hydroxide during the firing of the thick film paste. At elevated temperatures, these molten alkali hydroxides, e.g. NaOH and KOH, are capable of dissolving silicon dioxide, the coating which separates the thick film paste from the transparent coating which must be contacted by the thick film paste in order for the touch screen to function. The most direct method for incorporating alkali hydroxides into the thick film paste is to add them as the hydroxides themselves. However, these materials are highly corrosive, which makes them hazardous to handle, and can cause unwanted reactions to occur at room temperature. As an example of such an unwanted reaction, it was found that the addition of sodium hydroxide to the thick film paste resulted in a material that solidified within a period of a few hours after the addition of the material to the paste, making the paste useless for screen printing. In addition, the alkali hydroxides are very hygroscopic, absorbing atmospheric water, which then changes the composition of the thick film paste in an uncontrolled manner.

Accordingly, it is advantageous to formulate the paste instead with chemical precursors to alkali hydroxides which are relatively unreactive at the temperatures present during storage and screen printing, but which are converted into the desired alkali hydroxide at temperatures experienced during the firing of the thick film paste, typically in the vicinity of 500° C. The most desirable such precursor of those tested so far is sodium hydrogen carbonate. This material is harmless at room temperature, and is relatively non-hygroscopic. However, as it is heated, it first melts at about 50° C., and then loses $CO_2$ at about 100° C., converting to sodium carbonate. Sodium carbonate, in turn, starts to lose $CO_2$ at about 400° C., thereupon converting to sodium oxide in a perfectly dry environment, or to sodium hydroxide by further reaction with atmospheric water or water of combustion of the organic components of the thick film paste. At these temperatures, the sodium hydroxide is molten, and highly reactive, and accomplishes the required dissolution of the silicon dioxide layer.

In addition to sodium hydrogen carbonate, it is clear that sodium carbonate would also accomplish the same result, although it is more hygroscopic than sodium hydrogen carbonate, and thus more difficult to handle in the form of a finely divided powder. Similarly, it is expected that the addition of sodium nitrate which decomposes at temperatures below 500° C., would also accomplish a dissolution of a silicon dioxide layer. The use of either of these compounds for this purpose is therefore also covered by the present invention.

In addition to inorganic compounds of sodium, organometallic compounds containing sodium or potassium may also be used as precursors to form sodium or potassium hydroxide at elevated temperatures since these compounds tend to decompose at temperatures lower than the peak firing temperature of the thick film paste, producing alkali hydroxides in the presence of even small amounts of water, as exists in the environment of a typical firing oven. For example, it was found that the addition of sodium formate to the thick film paste produced the same desired result as the addition of sodium hydrogen carbonate. Similarly, it would be expected that the addition of sodium ethoxide, sodium isopropoxide, sodium methoxide, sodium oxalate, sodium tartrate, or, indeed, any compound consisting solely of sodium, carbon, hydrogen, and oxygen, would produce the desired effect, so long as that compound decomposes at temperatures below 500° C. Because of the hygroscopic nature of some of these compounds, they will be more difficult to formulate into a thick film paste than others in the series, however, the use of any of these compounds for the purpose of dissolving the hard coat layer made of a silicon dioxide or other materials is covered by the present invention.

Similarly, the use of the parallel potassium compounds to those described above, including potassium hydrogen carbonate, potassium carbonate, potassium nitrate, or organometallic potassium compounds such as potassium ethoxide, potassium isopropoxide, potassium methoxide, potassium oxalate, or potassium tartrate, or of mixed sodium/potassium carbonates or organometallics, such as potassium sodium tartrate, for the purpose of locally dissolving the hard coat layer, (e.g., silicon dioxide) are also covered by the present invention since those compounds can also be expected to decompose to form a molten alkali hydroxide (potassium hydroxide) at temperatures below 500° C.

Typically, resistive coating 32, FIG. 3 is applied by sputtering, evaporation, chemical vapor deposition, meniscus coating, screen printing, or pad printing. Protective hard coating 30 may be applied by dip coating, meniscus coating, sputtering, evaporation, chemical vapor deposition, screen printing, or pad printing. During firing, if the panel is subjected to infrared radiation, wavelengths of between 2.5 and 6.0 microns are preferred. See U.S. patent application Ser. No. 09/626,272 filed Jul. 25, 2000, incorporated herein by this reference.

The wire traces of the wire trace pattern should be electrically isolated from the edge electrodes of the edge electrode pattern. In this invention there are a few different ways of accomplishing electric isolation.

Figure 6:
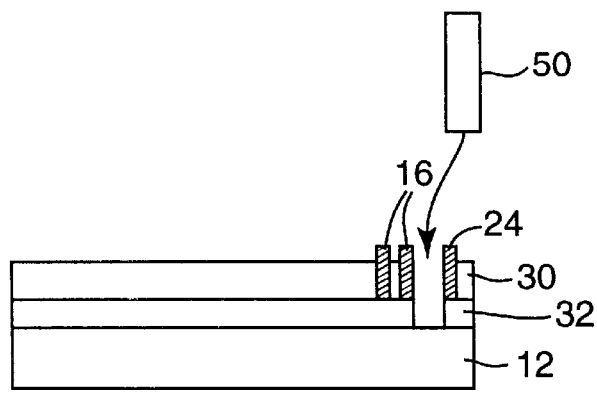
FIG. 6 is a cross sectional view of a touch screen panel manufactured in accordance with the subject invention wherein a laser is used to electrically isolate the wire traces from the edge electrodes.

In one embodiment, laser 30, FIG. 6 is used to ablate the hard coat 30 and resistive coating 32 material between wire trace 24 and edge electrodes 16. See U.S. patent application Ser. No. 09/773,979.

Figure 7:
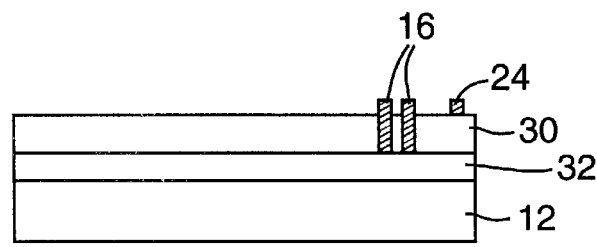
FIG. 7 is a cross sectional schematic view of a touch screen in accordance with the subject invention wherein the material of the wire traces does not contain an additive and thus the wire traces do not etch through the hard coat layer to provide electrical isolation between the wire traces and the edge electrodes.

In another embodiment, no additive is added to the material of the wire traces and they do not etch through the hard coat layer as shown in FIG. 7.

Figure 8:
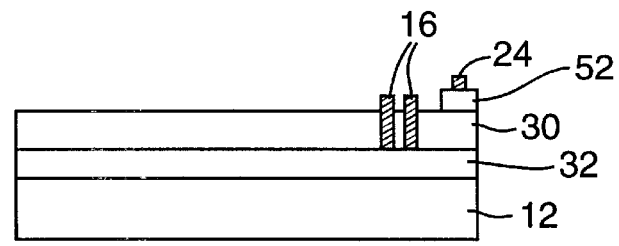
FIG. 8 is a cross sectional schematic view of a touch screen in accordance with the subject invention wherein a dielectric layer is located between the wire traces and the edge electrodes to provide electrical isolation.

In still another embodiment, dielectric layer 52, FIG. 8 is deposited between wire trace 24 and hard coat layer 30 to prevent wire trace 24 from etching through hard coat layer 30 and to provide electrical isolation between wire trace 24 and edge electrodes 16.

Figure 9:
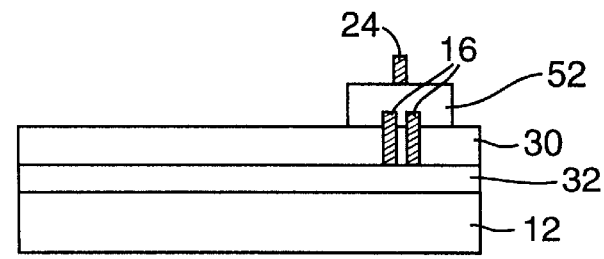
FIG. 9 is a cross sectional schematic view of a touch screen in accordance with the subject invention wherein the wire traces are located over the edge electrodes and electrically isolated therefrom by the addition of a dielectric layer.

In still another embodiment, dielectric layer 52, FIG. 9 is deposited over edge electrodes 16 and wire trace 24 is located on dielectric layer 52. This embodiment advantageously saves space at the edges at the panel providing more active area on the top surface of the panel.

In any embodiment, the wire traces and the dielectric layer may be deposited by screen printing or decals may be used as disclosed in application Ser. Nos. 09/775,253 and 09/773,979.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A method of manufacturing a touch screen panel, the method comprising:
    applying a resistive coating to one surface of an insulative substrate;
    applying an insulative protective coating to the resistive coating;
    depositing a conductive edge electrode pattern including a plurality of edge electrodes on the protective coating; and
    firing the panel until the edge electrodes etch through the protective coating and make electrical contact with the resistive coating.

2. The method of claim 1 in which the material of the edge electrodes includes conductive paste mixed with an additive.

3. The method of claim 2 in which the insulative protective coating includes silicon dioxide and the additive includes a chemical compound which is converted into a molten alkali hydroxide at elevated temperatures which dissolves the silicon dioxide of the protective coating.

4. The method of claim 3 in which the chemical compound is selected from the group consisting of sodium carbonates and sodium formates.

5. The method of claim 2 in which the conductive paste is a silver/frit composition.

6. The method of claim 2 in which the additive comprises 1–25% by weight of the conductive paste.

7. The method of claim 1 in which applying the resistive coating includes methods selected from the group consisting of sputtering, evaporation, chemical vapor deposition, meniscus coating, dip coating, screen printing, and pad printing.

8. The method of claim 1 in which the step of applying the insulative protective coating is a method selected from the group consisting of dip coating, meniscus coating, sputtering, evaporation, chemical vapor deposition, screen printing, and pad printing.

9. The method of claim 1 further including curing the insulative protective coating before the conductive edge electrode pattern is deposited thereon.

10. The method of claim 1 in which firing includes subjecting the panel to an elevated temperature.

11. The method of claim 10 in which firing further includes subjecting the panel to infrared radiation.

12. The method of claim 11 in which the infrared radiation has a wavelength of between 2.5 and 6.0 microns.

13. The method of claim 1 further including depositing a wire trace pattern on the protective coating and firing the panel until the wire trace pattern etches through the protective coating and makes electrical contact with the resistive coating.

14. The method of claim 13 in which the material of the wire trace pattern includes conductive paste mixed with an additive.

15. The method of claim 14 in which the insulative protective coating includes silicon dioxide and the additive includes a chemical compound which is converted into a molten alkali hydroxide at elevated temperatures which dissolves the silicon dioxide of the protective coating.

16. The method of claim 13 further including the step of providing electrical isolation between the wire trace pattern and the edge electrodes.

17. The method of claim 16 in which the step of providing electrical isolation includes using a laser to etch the protective material and the resistive material between the edge electrodes and the wire traces.

18. The method of claim 1 further including placing a wire trace pattern on the panel.

19. The method of claim 18 further including providing electrical isolation between the wire traces and the edge electrodes.

20. The method of claim 19 in which providing electrical isolation includes incorporating a dielectric layer between the wire trace pattern and the protective coating.

21. The method of claim 19 in which providing electrical isolation includes incorporating a dielectric layer between the edge electrodes and the wire traces.

22. The method of claim 19 in which providing electrical isolation includes not adding an additive to the material of the wire traces so they do not etch through the protective coating.

23. A method of manufacturing a touch screen panel, the method comprising:

applying a resistive coating to one surface of an insulative substrate;

applying an insulative protective coating to the resistive coating;

mixing a conductive paste with an additive;

depositing the mixture in the form of a conductive edge electrode pattern including a plurality of edge electrodes on the protective coating; and firing the panel until the edge electrodes etch through the protective coating and make electrical contact with the resistive coating.

24. The method of claim 23 in which the insulative protective coating includes silicon dioxide and the additive includes a chemical compound which is converted into a molten alkali hydroxide at elevated temperatures which dissolves the silicon dioxide of the protective coating.

25. The method of claim 24 in which the chemical compound is selected from the group consisting of sodium carbonates and sodium formates.

26. The method of claim 23 in which the conductive paste is a silver/frit composition.

27. The method of claim 23 in which the additive comprises 1–25% by weight of the conductive paste.

28. The method of claim 23 further including depositing a wire trace pattern on the protective coating and firing the panel until the wire trace pattern etches through the protective coating and makes electrical contact with the resistive coating.

29. The method of claim 28 in which the material of the wire trace pattern includes conductive paste fixed with an additive.

30. The method of claim 29 in which the insulative protective coating includes silicon dioxide and the additive of the material of the wire trace pattern includes a chemical compound which is converted into a molten alkali hydroxide at elevated temperatures which dissolves the silicon dioxide of the protective coating.

31. The method of claim 28 further including the step of providing electrical isolation between the wire trace pattern and the edge electrodes.

32. The method of claim 31 in which the step of providing electrical isolation includes using a laser to etch the protective material and the resistive material between the edge electrodes and the wire traces.

33. The method of claim 23 further including placing a wire trace pattern on the panel.

34. The method of claim 33 further including providing electrical isolation between the wire traces and the edge electrodes.

35. The method of claim 34 in which providing electrical isolation includes incorporating a dielectric layer between the wire trace pattern and the protective coating.

36. The method of claim 34 in which providing electrical isolation includes incorporating a dielectric layer between the edge electrodes and the wire traces.

37. The method of claim 34 in which providing electrical isolation includes not adding an additive to the material of the wire traces so they do not etch through the protective coating.

* * * * *